United States Patent Office 2,877,260
Patented Mar. 10, 1959

2,877,260

MANUFACTURE OF β-HALO-ALKYL PHOSPHITES

Charles H. Campbell, Decatur, Ala., and David H. Chadwick, Webster Groves, Mo., assignors to Monsanto Chemical Company, St. Louis, Mo., a corporation of Delaware No Drawing. Application August 29, 1955
Serial No. 531,291

5 Claims. (Cl. 260—461)

This invention relates to the manufacture of β-haloalkyl phosphites under commercially practicable and relatively safe conditions by causing an olefin oxide to react in an anhydrous system with phosphorus trichloride or phosphorus tribromide in the presence of hydrogen chloride or hydrogen bromide.

For laboratory preparations of β-halo-alkyl phosphites, it has been proposed that an olefin oxide be simply passed into a glass flask containing phosphorus trihalide (i. e. $PCl_3$ or $PBr_3$). However, on a plant scale it has been found extremely difficult to effect a mooth rapid reaction of these reagents in the early stages. It has been repeatedly observed in plant operations that during the early stages of addition of the olefin oxide to the phosphorus trihalide the reaction proceeds at so slow a rate that it permits accumulation of unreacted ethylene oxide dissolved in the reaction medium. This condition is always followed by an unexpected and large increase in the reaction rate accompanied by the evolution of a considerable amount of heat which results in a difficultly controllable system. As those workers in the chemical manufacturing field are well aware such conditions present an extreme hazard as well as requiring constant surveillance, which is both time consuming and expensive. In accordance with this invention it has been found the presence of hydrogen chloride or hydrogen bromide coupled with anhydrous conditions eliminates this hazardous condition and provides relatively complete control of the reaction. By so proceeding neither the yield nor purity of the β-halo-alkyl phosphite is impaired.

The particular olefin oxide used will depend upon the nature of the product desired. Thusly, β-chlorethyl phosphites or β-bromethyl phosphites are prepared from ethylene oxide and the appropriate phosphorus trihalide. Employing higher molecular weight olefin oxides, such as propylene oxide-1,2,3-chlor-propylene oxide-1,2, butylene oxide-1,2, butylene oxide-2,3, and the like, the corresponding β-halo-alkyl phosphite is obtained from the appropriate phosphorus trihalide. Depending upon the quantity of olefin oxide employed, one, two or all of the halogen substituents of the phosphorus trihalide may be replaced by β-halo-alkyl groups.

The reaction between the olefin oxide and the phosphorus trihalide in an anhydrous system and in the presence of hydrogen chloride or hydrogen bromide proceeds very rapidly and is characterized by ease of control. While the reaction may be carried out over a wide temperature range, e. g. temperatures ranging from any temperature which provides a fluid medium to the reflux temperature of the system, it is preferred that temperatures in the range of about 15° C. to about 25° C. be employed. In general the olefin oxide is added in the amount desired in gaseous or liquid form above the surface of the agitating mixture comprising the phosphorus trihalide. In that the reaction is highly exothermic, the temperature (if it be below the reflux temperature) may be held in the desired range by cooling of the reacting mass and regulation of the flow of the olefin oxide. If desired, pressures above atmospheric may be employed, however, such has not been found necessary in the present process.

It is not in general necessary to employ more than a small amount of hydrogen chloride or hydrogen bromide, however, the present invention is not limited in this respect. Ordinarily 0.1% to 2% by weight of hydrogen chloride or hydrogen bromide based on the phosphorus trihalide content is employed, although amounts in the range of 0.01% to 10% by weight may also be employed. Larger amounts may be used if desired.

As illustrative of the process of this invention, in a jacketed reaction vessel is added and mixed at about 0° C. and under a nitrogen atmosphere 274.8 pounds of anhydrous phosphorus trichloride and 1.5 pounds of anhydrous hydrogen chloride. Gaseous ethylene oxide is then added above the surface of this agitating mass, the reaction commencing almost spontaneously upon initial contact as evidenced by the rise in temperature in the reaction system. The addition rate of ethylene oxide in conjunction with the temperature of the brine (or similar cooling fluid) circulating in the jacket being such as to maintain the reaction system at a temperature of about 20° C. (in general in the process circulating brine at $-18°$ C. to $-10°$ C. in the jacket and adding ethylene oxide at a rate of about 15 to about 25 pounds per hour continuously throughout the course of the reaction resulted in a reaction temperature of $21 \pm 2°$ C.). The addition of ethylene oxide is stopped when the theoretical amount is absorbed to form tri-(β-chlorethyl) phosphite, which point is indicated by a relatively fast drop in temperature of three to five degrees centigrade in the reaction vessel. The mass is agitated for about 15 minutes and then subjected to vacuum distillation to remove any contaminants such as hydrogen chloride, etc. The yield of tri-(β-chlorethyl) phosphite is substantially quantitative.

To illustrate the control which characterizes the present invention, the addition of ethylene oxide may be stopped at any point and immediately the reaction temperature begins to drop. Thusly, the process of this invention as above described permits the manufacture of β-chlorethyl dichlorphosphite and di-(β-chlorethyl) monochlorphosphite of relatively high purity merely by stopping the ethylene oxide addition when the appropriate theoretical amount has been added.

In that the handling of anhydrous hydrogen chloride or hydrogen bromide presents many hazardous problems, this invention contemplates the usage of any material which can generate hydrogen chloride or hydrogen bromide in the reaction system provided, of course, that its usage does not result in a substantial amount of undesirable side reactions and/or undesirable by-products. In this vein phosphorous acid has been found to be outstanding. (It is believed in such a system either or both of the following reactions occur:

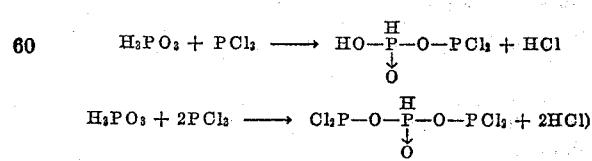

As illustrative of this embodiment is the following:

To a jacketed reaction vessel is added and mixed at 15° C. and under a nitrogen atmosphere 167 pounds of anhydrous phosphorus trichloride and 1.5 pounds of anhydrous phosphorous acid. Brine is circulated in the jacket and when the temperature of the aforedescribed mass is at 9° C. the addition of gaseous ethylene oxide above the surface of the agitating mass is begun. The following conditions were observed:

| Time, min. | Reaction Pot Temp., °C. | Lbs. of ethylene¹ oxide added | Brine Temp., °C. | | Remarks |
|---|---|---|---|---|---|
| | | | entering | leaving | |
| 0 | 9 | 0 | −18 | −18 | |
| 25 | 22 | 3 | −16 | −14 | Ethylene oxide addition stopped for 3 min., reaction pot temp. dropped off immediately. |
| 45 | 22 | 10 | −15 | −10 | |
| 60 | 21.3 | 14 | −16 | −11 | |
| 95 | 21.6 | 24 | −17 | −12 | Ethylene oxide addition stopped for 5 min., reaction pot temp. dropped to 17° C. |
| 120 | 20.5 | 31 | −18 | −13 | |
| 150 | 21.5 | 40 | −18 | −13 | |
| 180 | 21.0 | 49 | −19 | −14 | |
| 210 | 21.5 | 57 | −18 | −13 | |
| 240 | 22.0 | 65 | −18 | −13 | |
| 300 | 22.5 | 82 | −17 | −12 | |
| 360 | 22.0 | 100 | −19 | −14 | |
| 420 | 22.2 | 115 | −16 | −12 | |
| 480 | 22.4 | 132 | −19 | −14 | |
| 540 | 22.2 | 149 | −17 | −12 | |
| 570 | 21.7 | 158 | −17 | −12 | Reaction pot temperature dropping. |
| 585 | 18.2 | 162 | −17 | −12 | Ethylene oxide addition stopped. |
| 588 | 14.0 | | −18 | −13 | Circulating of brine stopped. |

¹ The ethylene oxide was vaporized by heating the cylinder containing same in a water bath maintained at 50° C. throughout the course of its addition to the reaction system.

Upon stopping the ethylene oxide addition and cutting off the circulating brine, the reaction mass is agitated for about 30 minutes while heating up to 55° C. whereupon the system is subjected to vacuum distillation to remove the various contaminants. A substantially quantitative yield of tri-(β-chlorethyl) phosphite is obtained.

When such materials as phosphorous acid, which in contact with phosphorus trichloride or phosphorus tribromide produce the corresponding hydrogen halide, are used, it is preferred that a small quantity be employed, as for example that amount which would provide 0.1 to 2% by weight hydrogen halide based on the phosphorus trihalide content.

The hydrogen halide may be introduced to the reaction system by other means, as for example by employment of an olefin halohydrin, such as ethylene chlorhydrin, ethylene bromhydrin, propylene chlorhydrin, and the like. The amount employed of such halohydrin is preferably that which would provide 0.1 to 2% by weight hydrogen halide based on the phosphorus trihalide content of the reaction system. As illustrative of this embodiment is the following:

To a jacketed reaction vessel is added and mixed at room temperature and under a nitrogen atmosphere 167 pounds of anhydrous phosphorus trichloride and 1.5 pounds of anhydrous ethylene chlorhydrin. Brine is circulated in the jacket as the addition of gaseous ethylene oxide above the surface of the agitating mass began. The following conditions were observed:

| Time, min. | Reaction Pot Temp., °C. | Lbs. of ethylene¹ oxide added | Brine Temp., °C. | | Remarks |
|---|---|---|---|---|---|
| | | | entering | leaving | |
| 0 | 22 | 0 | −7 | −7 | |
| 15 | 23 | 2.5 | −7 | −5 | |
| 45 | 21 | 8 | −12 | −8 | |
| 60 | 21 | 15 | −12 | −8 | |
| 90 | 21.4 | 20 | −12 | −9 | |
| 100 | 21.5 | 23 | −12 | −7 | Ethylene oxide addition stopped for 2 min., pot temperature dropped to 18° C. |
| 108 | 20 | 25 | −12 | −7 | |
| 135 | 20 | 30 | −14 | −9.5 | |
| 180 | 21.5 | 44 | −15 | −11.5 | |
| 210 | 21.2 | 53.5 | −15 | −11 | |
| 240 | 21.8 | 62.5 | −15 | −11 | |
| 300 | 20.8 | 80 | −14.5 | −11.5 | |
| 390 | 20.5 | 104.5 | −15 | −11 | |
| 450 | 20.0 | 120.5 | −14 | −11 | |
| 510 | 19.0 | 137.5 | −14.5 | −11 | |
| 570 | 18.7 | 156 | −14.5 | −11.5 | Circulating brine cut off. |
| 595 | 15.5 | 165.5 | −14.5 | −11.5 | |
| 630 | 16.0 | 173.5 | | | Ethylene oxide addition stopped. |

¹ The ethylene oxide was vaporized by heating the cylinder containing same in a water bath maintained at 50° C. throughout the course of its addition to the reaction system.

Upon stopping the ethylene oxide addition the reaction mass is agitated for about 15 minutes while heating up to 69° C. whereupon the system is subjected to vacuum distillation to remove the various contaminants. A substantially quantitative yield of tri-(β-chlorethyl) phosphite is obtained.

As illustrative of the process wherein hydrogen chloride or hydrogen bromide is not present in the reaction system is the following:

To a jacketed reaction vessel is added 167 pounds of anhydrous phosphorus trichloride at room temperature and under a nitrogen atmosphere. Brine is circulated in the jacket and the gaseous ethylene oxide is added above the surface of the agitated mass of phosphorus trichloride. The following conditions were observed:

| Time, min. | Reaction Pot Temp., | Lbs. of ethylene¹ oxide added | Brine Temp., °C. entering | Brine Temp., °C. leaving | Remarks |
|---|---|---|---|---|---|
| 0 | 18 | 0 | 5 | 5 | |
| 15 | 10.5 | 1 | 5 | 7 | Circulating brine cut off. |
| 35 | 14 | 3 | (no brine circulating) | | Reaction pot temperature beginning to rise, brine started up. |
| 45 | 18 | 5.5 | 4 | 8 | Circulating brine cut off. |
| 60 | 15 | 10.5 | (no brine circulating) | | |
| 75 | 17 | 14.0 | do | | Started circulating brine. |
| 90 | 18.5 | 20.5 | −8 | −2 | Ethylene oxide addition rate increased. |
| 105 | 18 | 25.5 | −9 | −4 | Ethylene oxide addition stopped. |
| 179 | 20 | (no ethylene oxide addition) | −11 | −6 | |
| 204 | 19.3 | do | −13 | 0 | |
| 225 | 16.5 | do | −13 | 5 | Ethylene oxide addition started again. |
| 240 | 18.5 | 29.5 | −14 | −5 | |
| 255 | 19.3 | 31.5 | −15 | −9 | |
| 270 | 20.3 | 35 | −16 | −11 | |
| 285 | 21.0 | 38 | −16 | −11 | |
| 310 | 22.5 | 42.5 | −16 | −11 | Ethylene oxide addition stopped and circulating brine cut off. |
| 325 | 18.0 | | | | Ethylene oxide addition and circulating brine started again. |
| 345 | 21.0 | 47.5 | −16 | −11 | |
| 360 | 20.8 | 50.5 | −16 | −11 | |
| 375 | 20.3 | 54 | −16 | −11 | |
| 435 | 20.8 | 70.5 | −16 | −13 | |
| 465 | 21 | 80 | −15 | −12 | |
| 525 | 21.8 | 97 | −16 | −12 | |
| 585 | 21.8 | 116 | −15.5 | −12 | |
| 615 | 21.3 | 125 | −14.5 | −11 | |
| 645 | 21.5 | 135 | −15.5 | −12 | Ethylene oxide addition stopped. |
| 670 | 20.6 | (no ethylene oxide addition) | −15.5 | −12 | Ethylene oxide addition started again. |
| 675 | 23 | 139 | −15.5 | −12 | Ethylene oxide addition stopped. |
| 685 | 16 | (no ethylene oxide addition) | −15.5 | −12 | Ethylene oxide addition started again. |
| 705 | 20.5 | 149 | −15.5 | −10 | |
| 735 | 20.8 | 157 | −14.5 | −11 | |
| 750 | 20.4 | 161.5 | −14 | −10 | |
| 765 | 18.8 | 166 | −14 | −10 | Ethylene oxide addition stopped and circulating brine cut off. |

¹ The ethylene oxide was vaporized by heating the cylinder containing same in a water bath maintained at 50° C. throughout the course of its addition to the reaction system.

Due to the highly exothermic nature of the reaction and the necessity of good temperature control during the ethylene oxide addition, an accurate and sensitive temperature measuring device was used in all of the process examples set forth herein. It consisted of two iron-constantan thermocouples, one of which was connected to a Brown automatic-recording instrument and the other one connected to a continuous indicating instrument in order to get faster response on temperature changes.

While this invention has been described with respect to certain embodiments it is not so limited and it is to be understood that variations and modifications thereof obvious to those skilled in the art may be employed without departing from the spirit or scope of the invention.

What is claimed is:

1. The method of manufacturing halo-alkyl phosphites which comprises causing an olen oxide containing not more than 4 carbon atoms to react in an anhydrous system with a phosphorus trihalide of the group consisting of phosphorus trichloride and phosphorus tribromide in the presence of a hydrogen halide of the group consisting of hydrogen chloride and hydrogen bromide.

2. The method of manufacturing chlor-alkyl phosphites which comprises causing an olen oxide containing not more than 4 carbon atoms to react in an anhydrous system and at a temperature of about 15° C. to about 25° C. with phosphorus trichloride in the presence of 0.01 to 10% by weight hydrogen chloride based on the weight of phosphorus trichloride.

3. The method of manufacturing tri-(β-chlorethyl) phosphite which comprises causing substantially three molecular proportions of ethylene oxide to react in an anhydrous system and at a temperature of about 15° C. to about 25° C. with substantially one molecular proportion of phosphorus trichloride in the presecnce of 0.1 to 2% by weight hydrogen chloride based on the weight of phosphorus trichloride.

4. The method of manufacturing tri-(β-chlorethyl) phosphite which comprises causing substantially three molecular proportions of ethylene oxide to react in an anhydrous system and at a temperature of about 15° C. to about 25° C. with substantially one molecular proportion of phosphorus trichloride in the presence of added phosphorous acid, the weight of phosphorous acid being such as to provide in the reacting system 0.1 to 2% hydrogen chloride based on the weight of phosphorus trichloride.

5. The method of manufacturing tri-(β-chlorethyl) phosphite which comprises causing substantially three molecular proportions of ethylene oxide to react in an anhydrous system and at a temperature of about 15° C. to about 25° C. with substantially one molecular proportion of phosphorus trichloride in the presence of ethylene chlorhydrin, the weight of said ethylene chlorhydrin being such as to provide in the reacting system 0.1 to 2% by weight hydrogen chloride based on the weight of phosphorus trichloride.

References Cited in the file of this patent

UNITED STATES PATENTS 1,936,985    Lommel et al. _____ Nov. 28, 1933

OTHER REFERENCES

Gregory: Uses and Applications of Chemicals and Related Materials, vol. I, Reinhold Publishing Corporation, New York, 1939, p. 315.

Kosolapoff: Organophosphorus Compounds, John Wiley & Sons, New York, 1950, p. 185.

UNITED STATES PATENT OFFICE
CERTIFICATE OF CORRECTION

Patent No. 2,877,260                                  March 10, 1959

Charles H. Campbell et al.

It is hereby certified that error appears in the printed specification of the above numbered patent requiring correction and that the said Letters Patent should read as corrected below.

Column 1, line 25, for "mooth" read -- smooth --; column 5, lines 57 and 64, for "olen" read -- olefin --; column 6, line 52, strike out "5. The method of manufacturing tri-($\beta$-chlor-" and insert the same as the first line of the paragraph which constitutes claim "5" following "chloride.", in line 52, same column.

Signed and sealed this 6th day of October 1959.

(SEAL)

Attest:

KARL H. AXLINE                                                        ROBERT C. WATSON
Attesting Officer                                                   Commissioner of Patents